United States Patent

Weinstein

[15] 3,646,518

[45] Feb. 29, 1972

[54] FEEDBACK ERROR CONTROL SYSTEM

[72] Inventor: Stephen Brant Weinstein, Holmdel, N.J.

[73] Assignee: Bell Telephone Laboratories, Incorporated, Murray Hill, N.J.

[22] Filed: May 5, 1970

[21] Appl. No.: 34,770

[52] U.S. Cl. ....................340/146.1, 178/23 A

[51] Int. Cl. ....................G08c 25/00, G06f 11/00

[58] Field of Search ................340/146.1; 178/23.1; 235/153

[56] References Cited

UNITED STATES PATENTS

| | | | |
|---|---|---|---|
| 3,452,330 | 6/1969 | Avery | 340/146.1 X |
| 3,496,549 | 2/1970 | Tong | 340/146.1 X |
| 3,534,330 | 10/1970 | Haller et al. | 340/146.1 |
| 3,544,963 | 12/1970 | Tong | 340/146.1 |

*Primary Examiner*—Charles E. Atkinson

*Attorney*—R. J. Guenther and Kenneth B. Hamlin

[57] ABSTRACT

Information sequences are encoded into a block code and both transmitted to a receiving terminal and stored at the transmitting terminal. The transmitted blocks are decoded at the receiving terminal and if uncorrectable errors are detected in a block, the receiving terminal transmits a feedback word to the transmitting terminal indicating that errors have been detected in the block in question. If uncorrectable errors have not occurred, the receiving terminal transmits to the transmitting terminal another feedback word which is a reduced version of the information portion of the block in question. Upon receipt of the feedback word, the transmitting terminal decides if a retransmission is required; if so, it substitutes, for the parity sections of subsequently transmitted blocks, that information sequence corresponding to the erroneous block.

20 Claims, 8 Drawing Figures

TRANSMITTING TERMINAL FIG. 1A
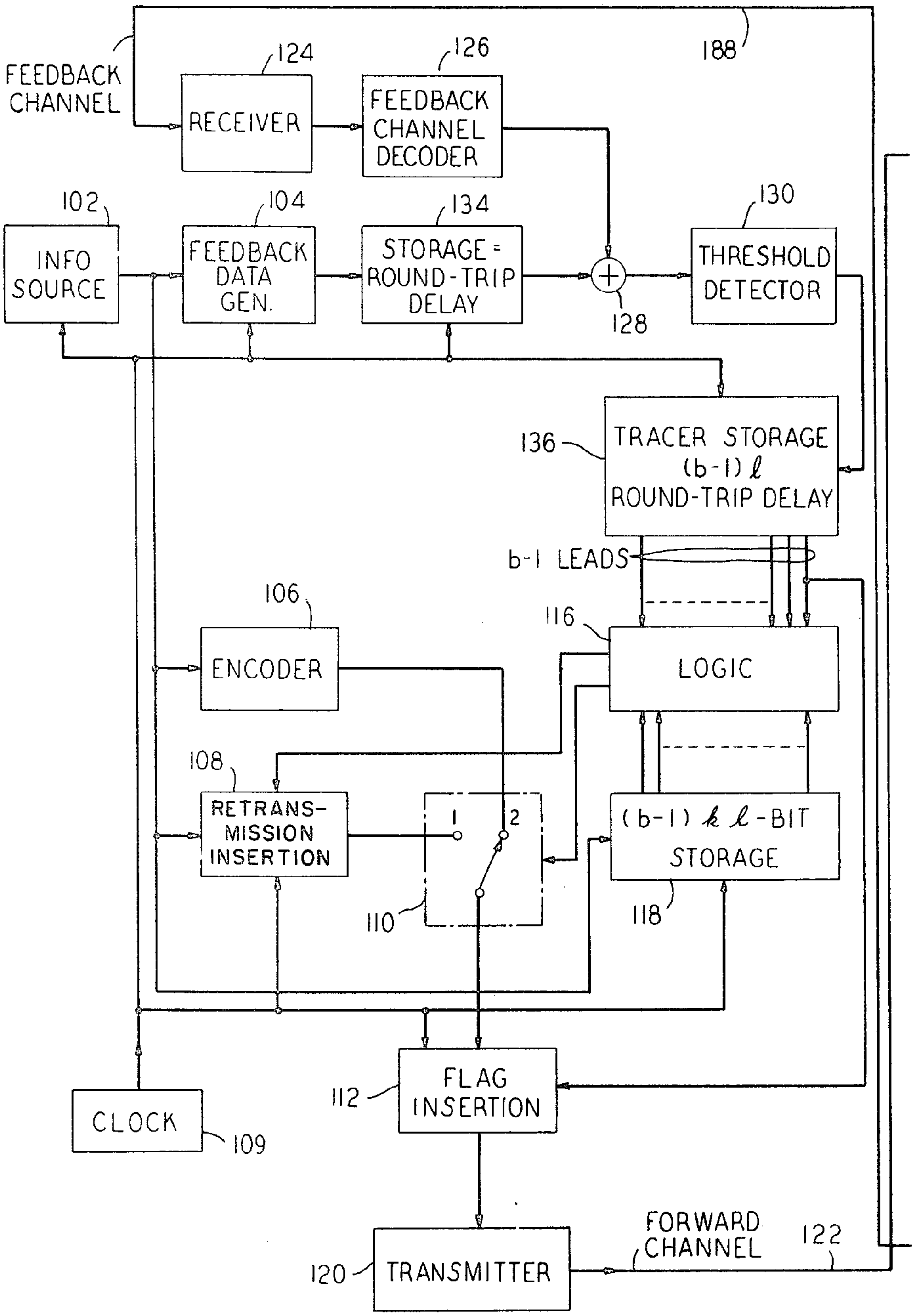
INVENTOR
S. B. WEINSTEIN
BY Calvin E Thorpe
ATTORNEY

FEEDBACK ERROR CONTROL SYSTEM

BACKGROUND OF THE INVENTION

1. Field of the Invention

This invention relates to data transmission and processing systems and more particularly to a feedback error detection and correction system.

2. Description of the Prior Art

There is a continuing interest in the data transmission field in finding efficient and economical methods of error control. This interest has been accelerated with the increased use of computers and especially with the need to transmit data between computers.

Methods of improving the accuracy of transmission of data may be broadly classified as (1) forward-acting error correction and (2) error detection and retransmission. The first method generally consists of encoding the data to be transmitted into special code words which include redundant bits sometimes called error check bits. (The term "bit" is an acronym for "binary digit." Binary digits are normally represented by "0" and "1" and will so be represented herein.) If the number of errors in a received word does not exceed the so-called error-correcting ability of the code, then the received word can be processed to determine specifically what bit positions were received in error. From this determination, the received words can be corrected. Examples of such codes are discussed in detail in "Error-Correcting Codes" by W. W. Peterson, The M.I.T. Press and John Wiley and Sons, 1961.

The second general method of improving the accuracy of transmitted data—error detection and retransmission—may consist simply of the appending of a single bit to each code word to be transmitted so as to give each word an even number of "1's" (or alternatively an even number of "0's"). Each code word would then be considered as having even parity. If an odd number of errors (transmuting a "1" to a "0" or vice versa) occurred in transmission, the received word would be detected as having odd parity rather than the expected even parity, thus indicating that error(s) had occurred. Upon detection of an error, the receiving end would signal the transmitting end to retransmit the erroneously received word.

With the last described arrangement, it is necessary to interrupt the transmission of data each time a retransmission is necessary. Furthermore, no matter how many errors occurred in a received word, whether one or many, a retransmission is necessary to correct the error. Finally, the retransmission request signal might be affected by errors causing the transmitter to misinterpret the signal.

SUMMARY OF THE INVENTION

In view of the above-described prior art arrangements, it is an object of the present invention to provide an arrangement for correcting certain errors by forward-acting error correction and for correcting other errors by error detection and retransmission.

It is another object of the present invention that such an arrangement yield a constant throughput of data, i.e., that normal data transmission be not interrupted to make a retransmission.

It is a further object of the present invention that such an arrangement include a feedback channel and provisions for correcting errors on the feedback channel.

These and other objects of the present invention are realized in a specific illustrative system embodiment in which information sequences are encoded in an $(n,k)$ error-correcting block code and stored at a transmitting terminal and also transmitted to a receiving terminal. A flag signal is included in each transmitted block to indicate whether or not the parity digits of the block have been replaced with previously transmitted information. If the flag signal indicates that the parity digits have been so replaced, the receiving terminal applies the information which replaced the parity digits to a utilization circuit, codes the remaining information digits of the block into a data word having a fewer number of digits, and sends this word to the transmitting terminal. If the flag signal indicates that the parity digits of the block have not been replaced, the receiving terminal decodes the block and either corrects or detects the errors found therein. If correction is performed, the receiving terminal also codes the corrected information digits into a data word having fewer digits and sends this word to the transmitting terminal. If the errors cannot be corrected but can be detected, the receiving terminal sends a retransmission request word to the transmitting terminal.

The transmitting terminal compares each word received from the receiving terminal with a corresponding data word previously generated from that information sequence to which the received word relates. If the words do not match, indicating an error in the transmitted information sequence, the transmitting terminal replaces the parity digits of a future block or blocks to be transmitted with the information sequence stored at the transmitting terminal.

BRIEF DESCRIPTION OF THE DRAWINGS

A complete understanding of the present invention and of the above and other objects and advantages thereof may be gained from a consideration of the following detailed description of a specific illustrative embodiment presented hereinbelow in connection with the accompanying drawings, in which:

FIG. 1A and 1B show a generalized illustrative feedback error control arrangement made in accordance with the principles of the present invention;

DETAILED DESCRIPTION

Figure 1B:
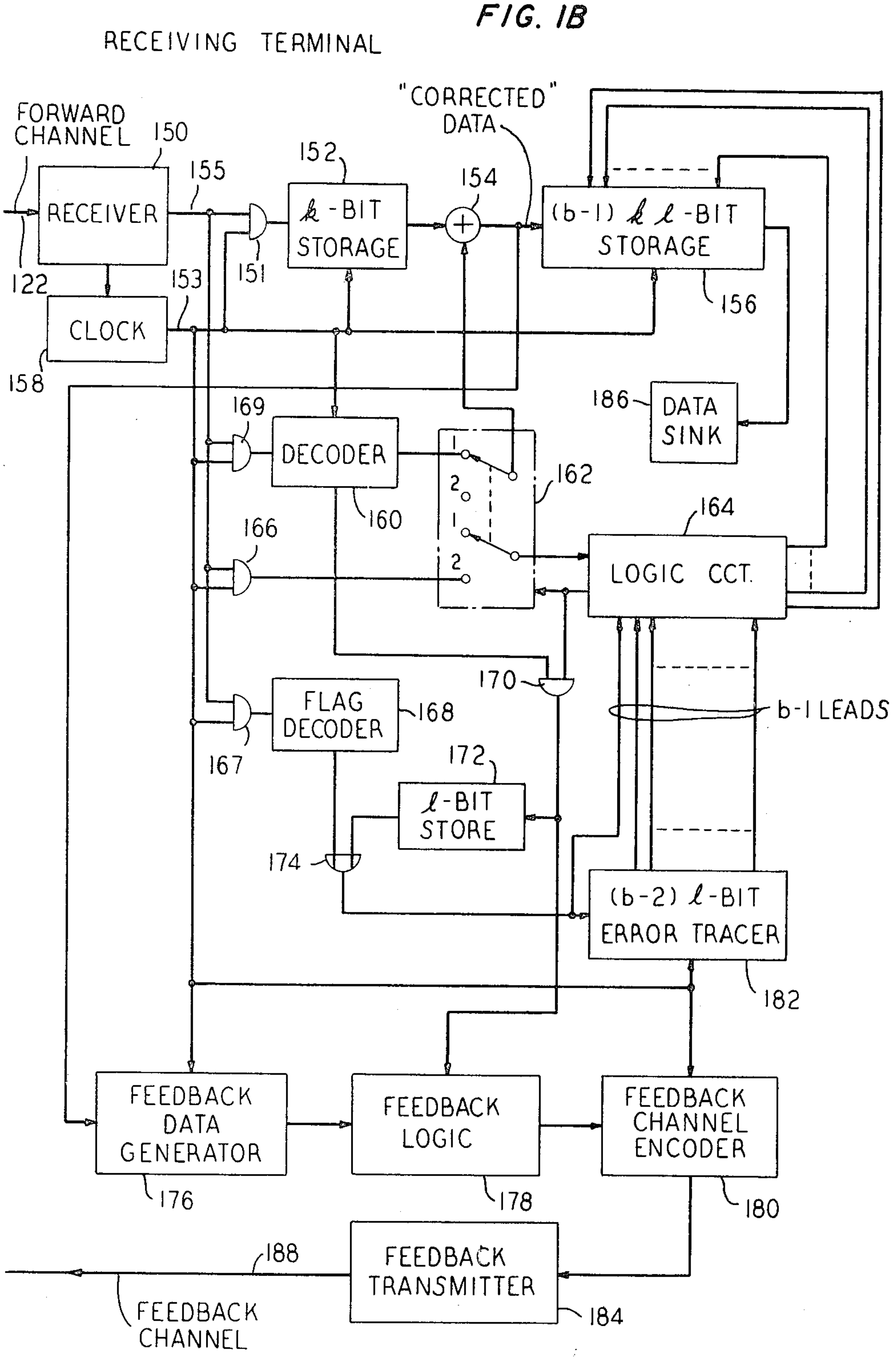

FIG. 1A shows a transmitting terminal and FIG. 1B a receiving terminal of a generalized illustrative feedback error control system made in accordance with the present invention. First, the transmitting terminal will be described assuming a so-called "normal" block of data is to be transmitted. (A "-normal" block is one which contains no previously transmitted information.) The receiving terminal will then be described assuming that either a "normal" block or a "retransmission" block is received. (A "retransmission" block is one which contains previously transmitted information.) Finally, the transmitting terminal will be described assuming a "retransmission" block is to be transmitted.

The transmitting terminal of FIG. 1A includes an information source 102 which applies information sequences of $k$ information bits successively to a feedback data generator 104, an encoder 106, and a retransmission insertion circuit 108. The encoder 106 encodes the $k$ information bits into a code word of an $(n,k)$ block code, where $k/n < (b-1)/b$ and $b$ is an integer, and applies the code word to a switch 110. When transmitting a "normal" data block or word, the switch 110 is set in position 2 and therefore the switch applies the encoded word to a flag insertion circuit 112. The flag insertion circuit 112, in response to a "0" signal received from a tracer storage unit 136, generates a "normal" flag prefix for the code word received from the switch 110. This prefix could consist of any number of bits as desired by the system designer. The flag insertion circuit 112 then applies the "normal" flag prefix plus the code word to a transmitter 120 for transmission over a forward communication channel 122.

The transmitted code word is received by a receiver 150 of FIG. 1B which thereafter applies the code word to an output lead 155. A clock 158 in response to the receiver 150 pulses an appropriate one of a plurality of leads 153 (designated by a single line) to enable AND-gate 167 thereby transferring the flag prefix of the received code word to a flag decoder 168. The clock 158 then pulses an appropriate one of the leads 153 to enable AND-gate 151 and transfer therethrough to a $k$-bit storage unit 152, the $k$ information bits of the received code word. The clock 158 also pulses an appropriate lead to enable AND-gate 169 and transfer therethrough to a decoder 160 the entire $n$-bit code word.

At this point it will be well to more specifically define the contents of a "retransmission" block. A "retransmission" block or word is simply a code word whose parity bits have been replaced with some of the information bits of a previously transmitted word which has been found to be in error. If a code of rate one-half is used, then the parity section of a "retransmission" word would be replaced with the entire information section of a previously transmitted word. If a code of rate two-third is used, then the parity sections of two "retransmission" words would be required to retransmit the information bits of a previously transmitted word. One-half of the previously transmitted information bits would replace the parity section of one "retransmission" word while the other half would replace the parity section of the other "retransmission" word, etc. All these words—the erroneous word and each of the "retransmission" words—are transmitted $l$ words apart. As will be discussed later when describing the transmitting terminal in more detail, only the first "retransmission" word of a succession of "retransmission" words used to retransmit an erroneous block will contain a flag prefix indicating a "retransmission" word.

The flag decoder 168 processes the flag prefix and determines whether the flag indicates a "normal" block or a first "retransmission" block (i.e., the first of a succession of "retransmission" words). If a "normal" block is indicated, the flag decoder 168 applies a "0" signal to OR-gate 174 whereas if a first "retransmission" block is indicated, the flag decoder 168 applies a "1" to OR-gate 174. This "1" signal is then applied to a $(b-2)l$-bit error tracer 182 and to a logic circuit 164. The parameter $l$ is the constraint length of the code, i.e., the distance between an erroneous block and the first subsequent block containing retransmitted information of the erroneous block. The logic circuit 164, in response to this "1" or to a "1" stored in any one of the every $l^{th}$ bit positions of the error tracer 182 (indicating that the received block is a "retransmission" block) causes a switch 162 to be set in position 2. If a "1" is not detected (indicating that the received block is a "normal" block), the logic circuit 164 causes the switch 162 to be set in position 1 and signals an AND-gate 170. The logic circuit 164 might illustratively comprise an OR-gate (whose inputs include the $b-1$ leads from the error tracer 182 and whose output controls switch 162 and AND-gate 170) and a series of $b-1$ AND gates (each of which, as will be described later, passes signals from switch 162 to a different portion of a $(b-l)kl$-bit storage unit 156 upon activation by a corresponding lead from the error tracer 182).

As indicated above only a first "retransmission" word will contain a flag prefix indicating a "retransmission" word. Of course, the logic circuit 164 will detect which subsequent words contain retransmission information because the "1" output from the flag decoder 168 will have been stored in the error tracer 182. Thus, if the error-correcting capability of the system is not exceeded, only a single "1" will be detected by the logic circuit 164. Detection of more than a single "1" (spaced $l$ bits or a multiple of $l$ bits apart) would indicate that errors have occurred in the constraint length of the code. When this occurs, the logic circuit 164 ignores all but the latest "1" applied by the OR-gate 174. This is important since the position of a detected "1" in the error tracer 182 influences the operation of the logic circuit 164 (to be described later).

While the flag decoder 168 and logic circuit 164 are performing their operations, the decoder 160 is decoding the received code word to determine whether the number of errors in the code word (if any) exceed the error-correcting capability of the code being utilized. (This determination is only valid, of course, if the received word is a "normal" word.) If the decoder 160 determines that the number of errors does exceed the error-correcting capability of the code, it applies a "1" signal to AND-gate 170. Recall, that if it is determined by the logic circuit 164 that the received word or block is a "normal" block, the circuit 164 applies a signal and AND-gate 170. This signal enables AND-gate 170 thereby transferring the "1" signal from the decoder 160 to an $l$-bit storage unit 172 and to a feedback logic unit 178. Application of a "1" to the $l$-bit storage unit 172 will serve to operate as a check on the determination to be made at the transmitting terminal as to whether or not a transmission is required (to be discussed later). Likewise, if the code word received $l$ words previously was erroneous, then the decoder would have applied a "1" to the storage unit 172 and this "1" would now be stored in the leftmost bit position of the storage unit 172. At this time, the contents of this leftmost bit position are also applied to the OR-gate 174. Thus, a "1" signal from either the flag decoder 168 or the $l$-bit storage unit 172 indicates that the most recently received block is a "retransmission" block.

Assume now that the received block is a "normal" block and that the decoder 160 determines that the number of errors in the block exceeds the error-correcting capability of the code. Under these circumstances, the $k$-bit storage unit 152 applies the $k$ information bits of the received block to a modulo-2 adder 154 which simply passes the bits unaffected to the $(b-1)k$ $l$-bit storage unit 156 and to a feedback data generator 176. The feedback data generator 176 codes the $k$ bits into a data word of fewer than $k$ bits such as, for example, by encoding the $k$ bits into a block code word and then utilizing only the parity bits of the word. The purpose of this operation is to "compress" the $k$ bits into a shorter length data word. This data word will be referred to hereafter as the "compressed" data word. The compressed data word (e.g., parity bits) is then applied to the feedback logic circuit 178 which, in response to the "1" signal from the AND-gate 170, inverts the data word and applies it to a feedback channel encoder 180. This inverted word will represent a retransmission request to the transmitting terminal. The feedback channel encoder 180 encodes the data applied thereto in a feedback code word and applies it to a feedback transmitter 184 which, in turn, applies it to a feedback channel 188.

Now assume that the received block is a "normal" block but that the decoder 160 determines that the number of errors in the block is within the error-correcting capability of the code. In this case, the switch 162 is set in position 1 by the logic circuit 164. The decoder 160 generates an error pattern word from the received code word and applies the error pattern word to the switch 162. Since the switch 162 is set in position 1, the error pattern word is applied to the adder 154. Simultaneously therewith, the $k$-bit storage unit 152 applies the $k$ information bits of the received word to the adder 154 which adds (modulo 2) the error pattern word to the $k$ information bits and applies the result to the $(b-1)k$ $l$-bit storage unit 156 and to the feedback data generator 176. Thus, if the number of errors in the received word is within the error-correcting capability of the code, the output of the adder 154 is a corrected sequence of $k$ information bits. The feedback data generator 176 "compresses" the $k$ bits into a data word and applies the word to the feedback logic circuit 178. Since there is no signal from the AND-gate 170 under the assumed conditions, the feedback logic circuit applies the "compressed" data word unaffected to the feedback channel encoder 180. The encoder 180 encodes the word and applies it to the transmitter 184 which applies it to the feedback channel 188.

Assume finally that a "retransmission" block has been received. In this case, the logic circuit 164 will have set the switch 162 in position 2 and will not have enabled AND-gate 170. The decoder 160 is thereby, in effect, disengaged from the system. The information section of the received word is transferred by the $k$-bit storage unit 152 unaffected through the adder 154 to the $(b-1)k$ $l$-bit storage unit 156 and to the feedback data generator 176. The feedback data generator 176 "compresses" the $k$ bits, as described earlier, and transfers the "compressed" data unaffected through the feedback logic circuit 178 to the feedback channel encoder 180. The parity section of the received word is applied via AND-gate 166 and switch 162 to the logic circuit 164. The logic circuit 164 then, depending upon the position of the "1" detected in the error tracer 182, applies this parity section to the appropriate section of the storage unit 156 thereby replacing the stored bits of this section with the contents of the just received parity section. Specifically, if a "1" were detected in the $jl^{th}$ bit position of the error tracer 182, the logic circuit 164 would replace the $j^{th}$ portion of $k/(b-1)$ bits of the $jl^{th}$ $k$-bit word stored in the $(b-1)k$ $l$-bit storage unit 156 with the just received parity section, where $j=0,..., b-2$. The lead from OR-gate 174 is considered the $0^{th}$ position of the error tracer 182. The remaining $jl^{th}$ positions of the error tracer 182 and the $jl^{th}$ words of the storage unit 156 are determined by counting from the left to the right in the units. The just received parity section, of course, contains the correct version of the information bits which are replaced.

At the transmitting end (referring to FIG. 1A), the feedback word (consisting of the compressed data encoded into a code word) is received by a receiver 124 and applied to a feedback channel decoder 126. The feedback channel decoder 126 decodes the code word, corrects errors, and applies the compressed data derived from the code word to a modulo-2 adder 128. A storage and delay unit 134 also applies a compressed data word to the adder 128. The compressed data word applied by the unit 134 was obtained from a feedback data generator 104 which in turn generated this compressed data word from the information sequence previously transmitted by the transmitting terminal to the receiving terminal. This transmitted sequence is of course the one to which the compressed data word received over the feedback channel relates. The storage and delay unit 134 delays application of the compressed data word generated by the feedback data generator 104 a period of time equal to the round trip delay time of the system before applying the compressed data word to the adder 128. The adder 128 then, in effect, compares the two data words and applies to the threshold detector 130 a signal identifying the number of bit positions in which the two compressed data words differ. If the number of differing positions exceeds a certain predetermined threshold value, the threshold detector 130 applies a "1" to a tracer storage unit 136, otherwise it applies a "0" thereto. The input to the tracer storage unit 136 appears at the $m^{th}$ output tap of the unit at a time equal to the time necessary to transmit $ml$ data words minus the round trip transmission delay time of the system, where $m = 1,..., b-1$. The outputs of the taps of the tracer storage unit 136 are applied to a logic circuit 116. The output of the first tap is also applied to a flag insertion circuit 112.

The logic circuit 116 examines the outputs on the $b-1$ taps of the tracer storage unit 136 and if logic circuit 116 detects a "1" on any tap, it causes the switch 110 to be set in position 1. The logic circuit 116 then causes a portion of the information stored in the storage unit 118 and corresponding to the position of the "1" detected by the logic circuit 116 to be applied to a retransmission insertion circuit 108. For example, a "1" on the $m^{th}$ tap of the tracer storage unit 136 will cause the logic circuit 116 to pass to the circuit 108 the $m^{th}$ section of $k/(b-1)$ bits of the block transmitted $ml$ blocks earlier. The purpose of this is to retransmit this portion in the block to next be transmitted. That is, the logic circuit 116 has detected that a previously transmitted block containing this portion was determined to be in error and that a retransmission is necessary. The logic circuit 116 might illustratively comprise a collection of AND gates, each of which has as inputs a different lead from the tracer storage unit 136 and a corresponding lead from storage unit 118. The outputs of the AND gates are connected to a common OR gate which routes the output of the active AND gate to the retransmission insertion unit 108. The logic circuit 116 might illustratively further comprise another OR gate whose inputs include the leads from the tracer storage unit 136 and whose output controls switch 110. The retransmission insertion circuit 108 applies the portion received from the logic circuit 116 along with the information sequence to next be transmitted (received from the information source 102) via the switch 110 (which as indicated earlier was set in position 1) to the flag insertion circuit 112.

If, on the other hand, the logic circuit 116 does not detect a "1" on any of the taps of the tracer storage unit 136, it causes the switch 110 to be set in position 2. The encoder 106 then encodes the information sequence to next be transmitted and applies the encoded word via the switch 110 to the flag insertion circuit 112.

The flag insertion circuit 112, in response to a "0" from the tracer storage unit 136, inserts a "normal" flag indication in the block to be transmitted and, in response to a "1" from the unit 136, indicating that the block transmitted $l$ blocks earlier was erroneously received, inserts a "retransmission" flag indication in the block. The block is then applied by the flag insertion circuit 112 to the transmitter 120 for transmission over the channel 122. As indicated earlier, only the first of a succession of "retransmission" words used to retransmit an information sequence contains a "retransmission" flag. Thus, the flag insertion circuit 112 operates to insert a "retransmission" flag only when the "1" signal identifying an erroneous block appears at the first (rightmost) tap of the tracer storage unit 136 and not at any later times when this "1" signal is detected at other taps of the tracer storage unit 136 by the logic circuit 116. This completes the description of the FIG. 1A and 2A system.

A specific illustrative embodiment of a system for utilizing the principles of the present invention will now be described with reference to FIG. 2A and 2B. The system there shown utilizes a binary (10,5) shortened cyclic code. The constraint length between an original transmission and its possible retransmission is $l$=4 blocks. The generator polynomial of the code is $G(x)=x^5+x^3+x+1$. The system is capable of correcting single random errors, without retransmission, detecting double random errors, and correcting burst errors that occupy four 10-bit blocks provided they are detectable. Three bits are used as flag bits and will precede each transmitted word. The feedback word of the system is derived by encoding the received information section of a block into a (9,5) block code having a generator polynomial $G(x)=x^4+x+1$ and retaining only the four parity bits of each such encoded word as a "compressed" information sequence. The four parity bits are, in turn, encoded into a (7,4) block code having a generator polynominal $G(x)=x^3+x+1$. The feedback word is thus a seven-bit word.

Figure 2A:
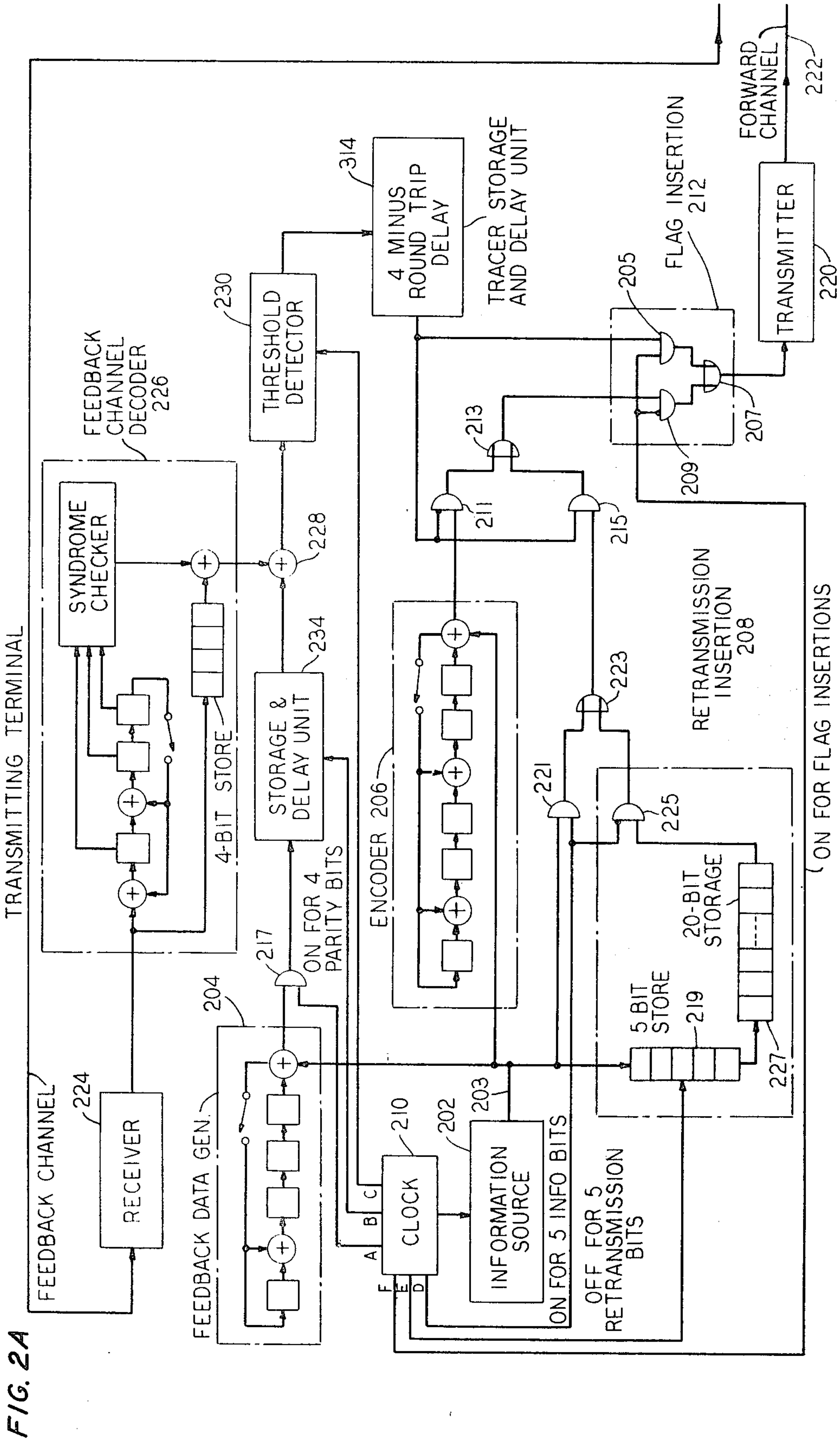
FIG. 2A and 2B show a detailed implementation of a feedback error control arrangement which utilizes a (10,5) block code.
Figure 2B:
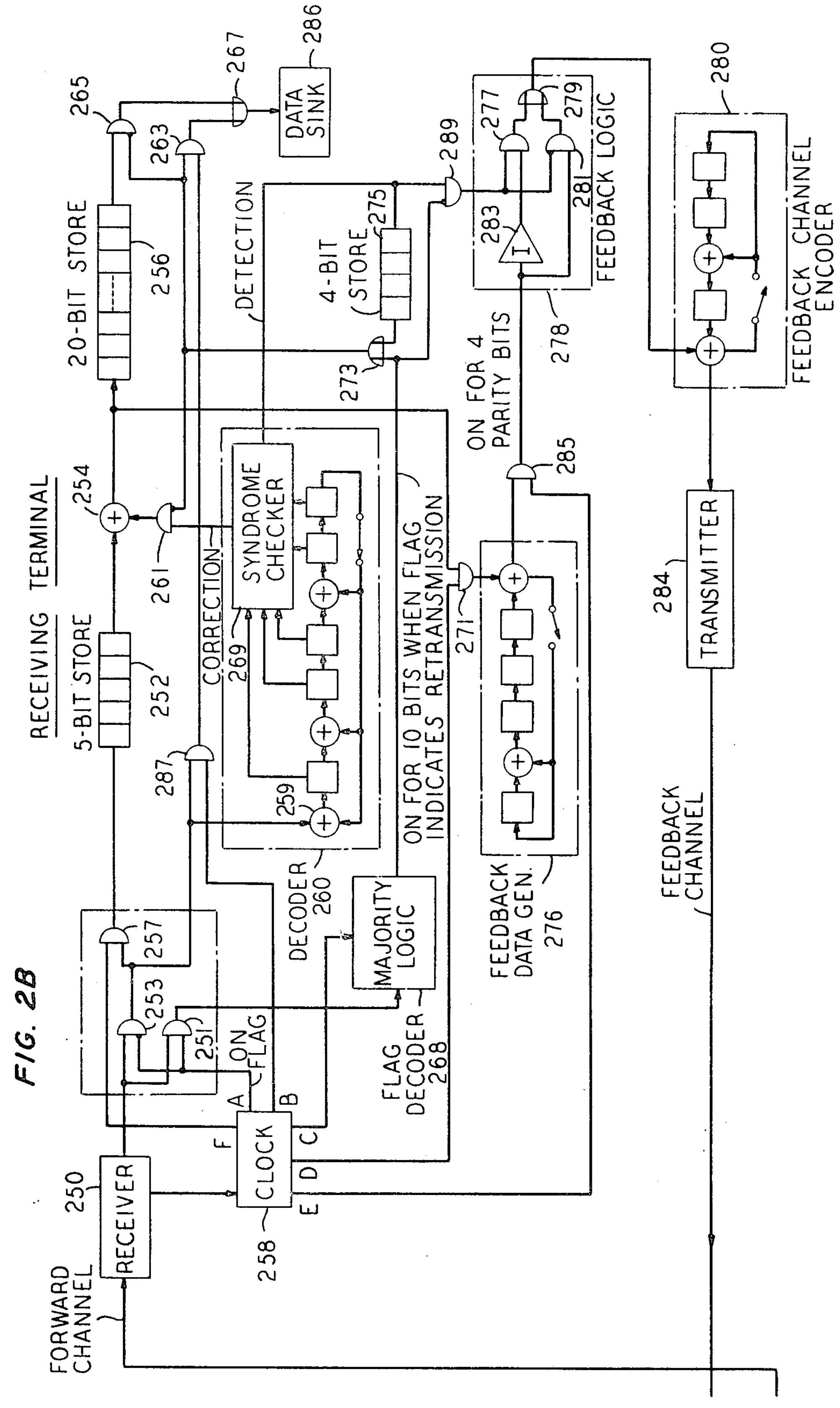
Figure 3A:
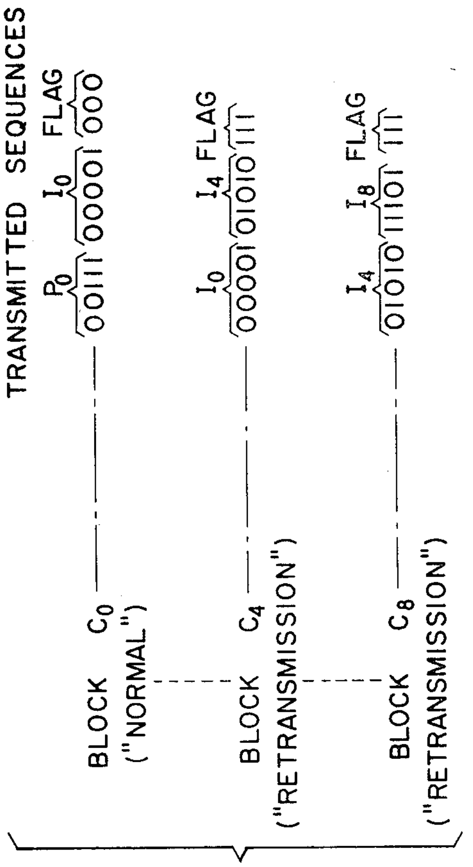
FIG. 3A, 3B, 3C and 3D show a listing of outputs of various units of the system of FIG. 2A and 2B which are generated in the course of processing certain exemplary information sequences.

The FIG. 2 system, including a transmitting terminal shown in FIG. 2A and a receiving terminal shown in FIG. 2B, will now be described assuming that the three information sequences $I_0$, $I_4$ and $I_8$ shown in FIG. 3A are, among others, to be transmitted by the system. It will be assumed that block $C_0$ is the first block to be transmitted, followed by three additional blocks not shown in FIG. 3A, and then that block $C_4$ is to be transmitted, again followed by three blocks not shown, and finally that block $C_8$ is to be transmitted. The fact that $C_4$ and $C_8$ are "retransmission" blocks is not decided a priori, of course, but is a function of the error patterns which occur during transmission of $C_0$ and $C_4$.

Consider now the transmission of block $C_0$ by the transmitting terminal of FIG. 2A. Assuming either that there have been no previous transmissions or that any previous transmissions were made correctly, the output of a tracer storage and delay unit 314 is "0." The delay of a signal passing through the tracer storage and delay unit 314 is equal to the time it takes to transmit four blocks of data minus the round trip delay time of the system. This is indicated by the legend shown in the unit 314. Transmission begins by a clock 210 enabling an AND-gate 205 of a flag insertion circuit 212 via lead F for three bit times causing the passage therethrough of three "0's," from the tracer storage and delay unit 314. These three "0's," which represents a "normal" flag signal, are applied via an OR-gate 207 to a transmitter 220. The clock 210 then disables AND-gate 205 and enables AND-gate 209 of the flag insertion circuit 212 and signals an information source 202 via lead G to apply five information bits to a lead 203. The information source 202 then applies the five information bits $I_0$ (shown in FIG. 3A) to the lead 203 and to an encoder 206. The encoder 206 generates the five parity bits $P_0$ (also shown in FIG. 3A) in accordance with the aforementioned (10,5) block code. The information bits $I_0$ and parity bits $P_0$ are applied via an AND-gate 211, which is enabled by the "0" output of the tracer storage and delay unit 314, and via an OR-gate 213, AND-gate 209, and OR-gate 207, to a transmitter 220. The transmitter then transmits the thirteen bit block $C_0$ shown in FIG. 3A via a channel 222 to the receiving terminal of FIG. 2B.

The information source 202 also applies the five information bits $I_0$ to a feedback data generator 204 which generates a four bit parity word therefor. The clock 210 then enables an AND-gate 217 thereby transferring these four parity bits from the feedback data generator 204 to a storage and delay unit 234. The five information bits $I_0$ are also applied by the information source 202 to a retransmission insertion circuit 208 and specifically to a five-bit storage unit 219 to await the time when, if necessary, the bits can be retransmitted. The above described operations at the transmitter of FIG. 2A are briefly represented by the first two lines of FIG. 3B.

Figure 3B:
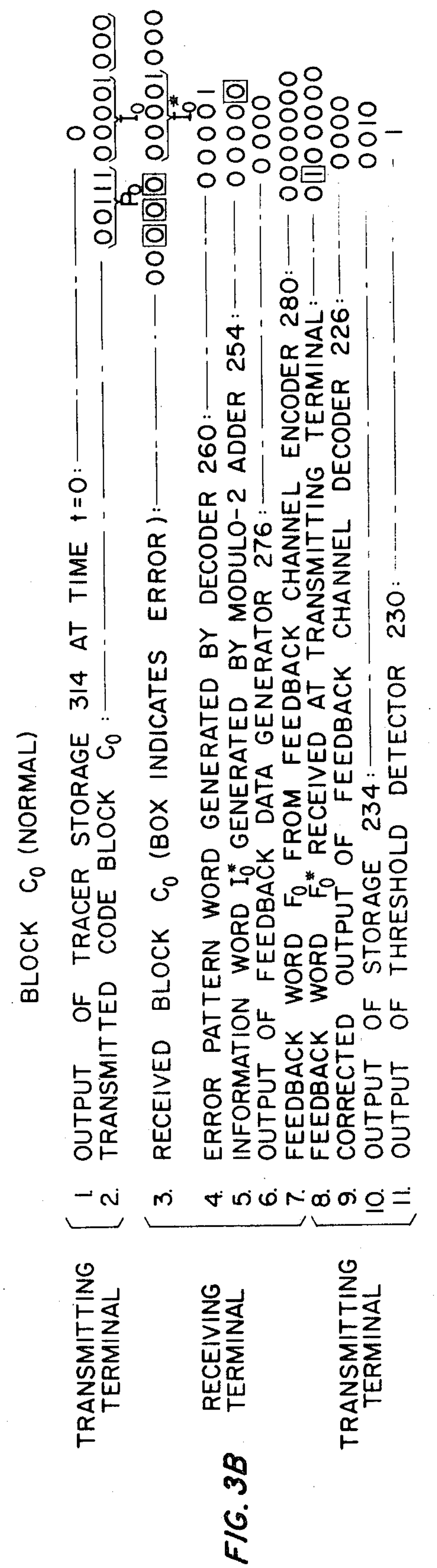

Now assume that three errors occur in the transmitted block $C_0$ in the positions indicated by the boxes shown in line 3 of FIG. 3B. Upon receipt of this sequence by a receiver 250 (of FIG. 2B) a clock 258 applies a "1" signal to lead A for three bit times thereby routing the three flag bits of the received sequence via AND-gate 251 to a flag decoder 168. The flag decoder 268 outputs a "1" for 10 bit times if at least two of the three received flag bits are "1" and outputs a "0" otherwise. In this case, all three flag bits are "0" and therefore the output of the flag decoder 268 is "0" indicating receipt of a "normal" flag prefix. (Majority decoding of the flag bits provides error protection for the flag prefix.) Following this, the clock 258 enables an AND-gate 253 for 10 bit times and an AND-gate 257 for five bit times thereby passing the received information bits 00001 into a five-bit storage unit 252 and the five information bits plus the five parity bits of the received sequence to a decoder 260. The decoder 260 generates a syndrome from this data and determines from this syndrome whether or not the transmission errors in the received sequence are correctable or only detectable. In this particular case, although the transmission errors are not in fact correctable since the number of errors exceeds the error correcting capability of the code, the decoder wrongly determines that the errors are correctable. Accordingly, a syndrome checker 269 of the decoder 260 applies an error pattern word 00001 to an AND-gate 261, which is enabled by the "0" output of the flag decoder 268. This error pattern word is then applied to a modulo-2 adder 254 simultaneously with the application thereto of the information word $I_0$ from the five-bit storage unit 252. The output of the modulo-2 adder 254 is thus the word $I_0{}^* = 00000$, which, of course, is not the correct version of the transmitted information word $I_0$. This information word is applied to a 20-bit storage unit 256 and to an AND-gate 271. If sequences had been previously transmitted, then as the information word $I_0{}^*$ was applied to the storage unit 256, the unit would in turn apply the five information bits received four blocks previously to an AND-gate 265. This AND gate would be enabled by the "0" output of the flag decoder 268 and thus the information bits would be applied via an OR-gate 267 to a data sink 286.

It should be noted here that if the syndrome checker 269 had determined that there were more errors in the received word than could be corrected, it would have applied a "1" to a four-bit store 275. This "1" would indicate that the block to be received four blocks later should be a "retransmission" block. Application of a "1" to the four-bit store 275 under these conditions operates as a check on the decoding of the flag prefix to be received four blocks later. Alternatively, if the block received four blocks previously were detected as containing uncorrectable errors, then the output of the four-bit store 275 at this time would have been a "1," and OR-gate 273 would have been enabled indicating receipt of a "retransmission" word.

As indicated earlier, the information word $I_0{}^=$ is applied by the modulo-2 adder 254 to the AND-gate 271 which is enabled by the clock 258 via lead D. The information word $I_0{}^=$ is thus applied to the feedback data generator 276 which "compresses" the information word by generating four parity bits in accordance with the aforementioned (9,5) block code. These parity bits are then applied via an AND-gate 285, which is enabled by the clock 258, to the feedback logic unit 278. Since, in this case, the syndrome checker 269 determined that correction was possible, a "0" is applied by the syndrome checker 269 to an AND-gate 289 which, in turn, generates a "0" output. This output enables an AND-gate 281 which then passes the four parity bits from the data generator 276 to an OR-gate 279 and then to a feedback channel encoder 280. The feedback channel encoder 280 then encodes the parity bits into a seven-bit code word in accordance with the aforementioned (7,4) block code and applies the word to a transmitter 284. The transmitter transmits the feedback word over a feedback channel to the transmitting terminal. The feedback word, which is shown in line 7 of FIG. 3B, is not, in this case, intended as a retransmission request, since the syndrome checker 269 determined that correction of errors was possible. The operation described above for the receiver of FIG. 2B is briefly represented by lines 3–7 of FIG. 3B.

If a "1" is applied by the syndrome checker 269 to AND-gate 289 simultaneously with the application thereto of a "0" by the flag decoder 268, AND-gate 289 applies a "1" to the feedback logic unit 278 and specifically to AND-gate 277. The data output of the feedback data generator 276 is then applied to an inverter 281 which inverts this data and applies it via AND-gate 277 and OR-gate 279 to the feedback channel encoder 280. This inverted data represents a retransmission request. The intention is to generate a retransmission request word which is as different as possible from a "nonretransmission request" word. This of course is done by simply inverting all bits of the feedback information. The control which the flag decoder 268 exercises on AND-gate 289 prevents the transmission of a "retransmission request" feedback word when the decoder 260 in operating upon a received "retransmission" word (in which, of course, the decoder cannot correct or detect errors).

The feedback word $F_0{}^=$ is received by a receiver 224 of the transmitting terminal of FIG. 2A. This feedback word contains one error which occurred during the course of the feedback transmission (see line 8 of FIG. 3B). The receiver 224 applies the feedback word to a feedback channel decoder 226 which corrects the error and applies the four bits 0000 (see line 9 of FIG. 3B) to a modulo-2 adder 228. It should be recalled here that these four bits are the compressed information obtained by encoding the word $I_0{}^=$ into the parity bits of a (9,5) block code. Also recall that the information source 202 had applied the information word $I_0$ to the feedback data generator 204. The feedback data generator 204 then generates four parity bits 0010 in accordance with the aforementioned (9,5) block code and applied these parity bits via the AND-gate 217 to the storage unit 234. These parity bits after being delayed an amount of time equal to the round trip delay time of transmission, are applied to the modulo-2 adder 228. The modulo-2 adder 228 then adds the four parity bits from the storage and delay unit 234 to the four parity units from the feedback channel decoder 226 and applies the resultant to a threshold detector 230. The resultant in this case is the word 0010. If the word received by the threshold detector 230 contains one or more "1's," it applies a "1" signal to the tracer storage and delay unit 314 (see line 11 of FIG. 3B). The tracer storage and delay unit 314 applies this input signal to its output after a time equal to the transmission time of four blocks minus the round trip delay time.

Now assume that the transmitting terminal is about to encode and transmit the information sequence $I_4$=01010 (see FIG. 3A). At this time, the "1" applied by the threshold detector 230 to the tracer storage and delay unit 314 (discussed above) constitutes the output of the tracer storage and delay unit. This "1" output in conjunction with a signal from the clock 210 to AND-gate 205 of the flag insertion circuit 212 causes a flag prefix of 111 to be applied via OR-gate 207 to the transmitter 220. This flag prefix indicates that the block to next be transmitted will contain a retransmission. The information source 202 then applies the information word $I_4$ via AND-gate 221, OR-gate 223, AND-gate 215 (which is enabled by the "1" output of the tracer storage and delay unit 314) and OR-gate 213 to the flag insertion circuit 212. The information word $I_4$ is then applied through AND-gate 209, which is enabled by lead F from clock 210, to the transmitter 220. The information word $I_0$, which has been stored in the storage unit 227 of the retransmission insertion circuit 208, is then applied via AND-gate 225, OR-gate 223, AND-gate 215, and OR-gate 213 to the flag insertion circuit 212 and then to the transmitter 220. The transmitter 220 transmits the flag prefix followed by the information word $I_4$ and the information word $I_0$ as indicated in line 2 of FIG. 3C.

Figure 3C:
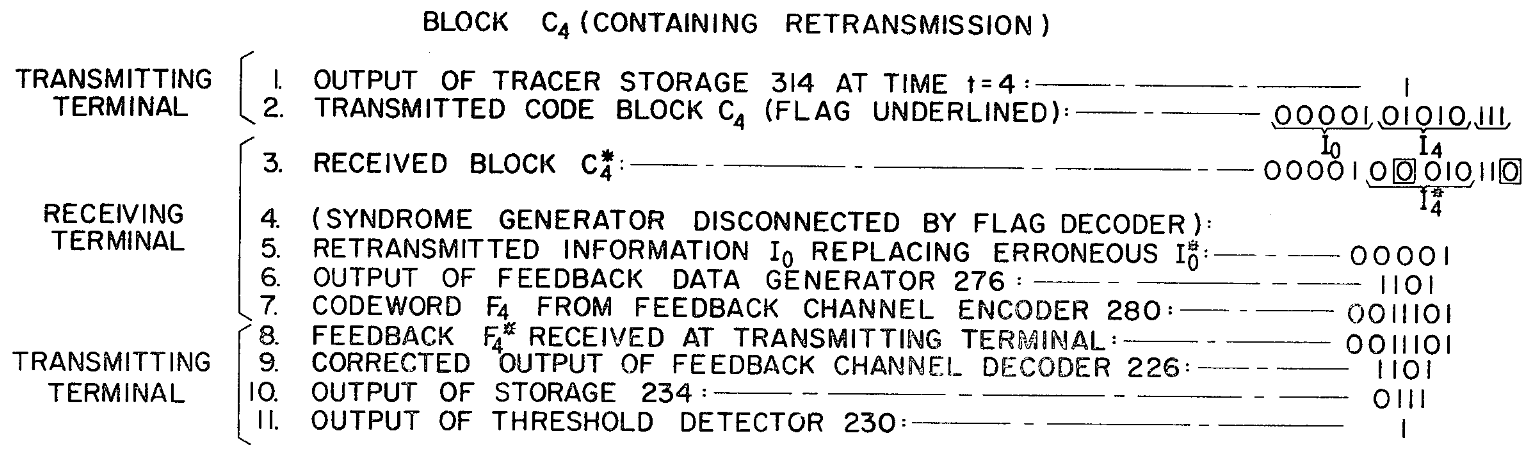

Assume that the block $C_4^=$ received by the receiving terminal of FIG. 2B contains two errors indicated by the boxes shown in line 3 of FIG. 3C. Since at least two of three bits in the flag prefix are "1," the flag decoder 268 applies a "1" signal via OR-gate 273 to AND-gate 261, thereby disabling the AND gate, and to AND-gate 263, thereby enabling this AND gate. The information word $I_4^=$ is transferred by the receiver 250 via AND-gate 253 and AND-gate 257 to the five-bit store 252. The retransmitted information word $I_0$ is then applied by the receiver 250 via AND-gate 253, AND-gate 287, AND-gate 263, which was enabled by the flag decoder 268, and OR-gate 267 to the data sink 286. At this time, the erroneous $I_4^=$ is shifted out of the 20-bit character store 256. In this manner, the erroneous information word $I_4^=$ is replaced by the correct version $I_4$ which was retransmitted. Thus, even through the decoder 260 originally determined that the information block $C_0$ was correctly received, the other error control features of the invention detected this error and corrected it.

The information word $I_4^=$ is applied by the five-bit store 252 via the modulo-2 adder 254 to the character store 256 and also via the AND-gate 271 to the feedback data generator 276. (Recall that the information word $I_4^=$ contains an error as shown in line 3 of FIG. 3C.) The feedback data generator 276 generates four parity bits for the information word $I_4^=$ and applies these parity bits via the AND-gate 285, AND-gate 281, and OR-gate 279 to the feedback channel encoder 280. (AND-gate 281 is enabled since the "1" output of the flag decoder 268 disables AND-gate 289 thereby enabling AND-gate 281.) The feedback channel encoder 280 encodes the parity bits into a code word $F_4$ and applies the word to the transmitter 284 which transmits the word over the feedback channel to the transmitting terminal of FIG. 2A. These operations are briefly represented in lines 3–7 of FIG. 3C.

The feedback word $F_4^=$ is received by the receiver 224 and applied to the feedback channel decoder 226 which decodes the word and applies the bits 1101 to the modulo-2 adder 228. These bits are, of course, the parity bits generated for the information word $I_4^=$ in accordance with the (9,5) block code. At this time, the storage and delay unit 234 applies four parity bits 0111 to the modulo-2 adder 228. These parity bits were generated by the feedback data generator 204 for the information block $I_4$. The two parity sections are added by the modulo-2 adder 228 and applied to the threshold detector 230 which detects the presence of a "1" in the resulting word indicating that the parity words did not compare. The threshold detector 230 then applies a "1" output to the tracer storage and delay unit 314. The operations of the transmitting terminal after receipt of the feedback word $F_4^=$ are briefly represented by lines 8–11 of FIG. 3C.

Now assume that the transmitting terminal is about to encode and transmit the information work $I_8$ shown in FIG. 3A. Since the output of the tracer storage and delay unit 314 at this time is a "1" as discussed above, a flag prefix of 111 is applied by the clock 210 via AND-gate 205 and OR-gate 207 to the transmitter 220. Then the information source 202 applies the information word $I_8$ via AND-gate 221, OR-gate 223, AND-gate 215, and OR-gate 213 to the flag insertion circuit 212 and from there to the transmitter 220. The information work $I_4$ which was stored in the storage unit 227 of the retransmission insertion circuit 208 is applied via AND-gate 225, OR-gate 223, AND-gate 215 and OR-gate 213 to the flag insertion circuit 212 and, similarly, from there to the transmitter 220. Thus the transmitted code block $C_8$ shown in line 2 of FIG. 3D, is transmitted by the transmitter 228 over the forward channel 222 to the receiving terminal of FIG. 2B.

Figure 3D:
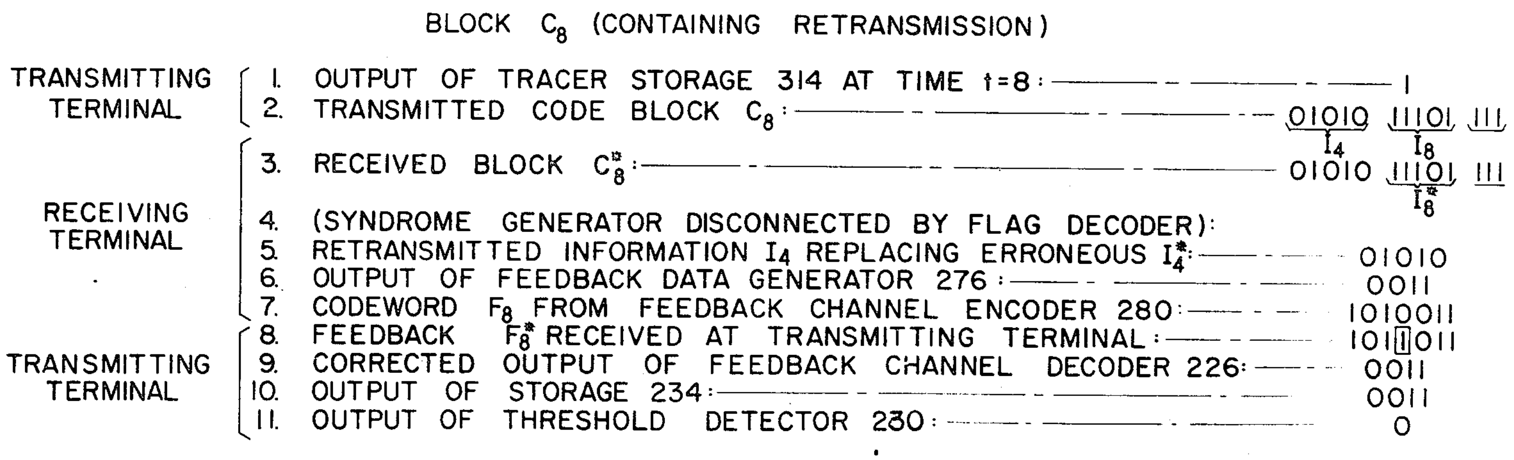

The block $C_8^=$, as shown in line 3 of FIG. 3D, is received by the receiver 250 without any errors. The flag prefix is applied by the receiver 250 to the flag decoder 268 which, in response thereto, applied a "1" to its output. The information word $I_8^=$ is then applied to the 5-bit store 252 and the retransmitted information word $I_4$ is applied via AND-gate 253, AND-gate 287, AND-gate 263, and OR-gate 267 to the data sink 286. The receiving terminal of FIG. 2B then processes the received block $C_8$ in the manner previously described, generating a feedback code work $F_8$ for transmission to the transmitting terminal. The processing of $C_8^=$ at the receiving terminal is represented by lines 3–7 of FIG. 3D.

Assume that the feedback word $F_8^=$ is received by the receiver 224 of FIG. 2A containing one error as shown in line 8 of FIG. 3D. The feedback channel decoder 226 would decode this word, correcting the error, and then apply the word 0011 to the modulo-2 adder 228 as shown in line 9 of FIG. 3D. The output of the storage and delay unit 234 would also be 0011 and thus the output of the modulo-2 adder 228 after combining these two words would be 0000. The threshold detector 230 would then output a "0" to the tracer storage and delay unit 314 indicating that there is no need for a retransmission of the information word $I_8$. Processing then continues as previously discussed.

In discussing the illustrative system embodiment of FIG. 2A and 2B, it was assumed that errors occurred in both forward transmission and feedback transmission to illustrate the error correcting capabilities of the system. As shown, the system has the capability of correcting a variety of errors.

What is claimed is:

1. In a data transmission system having a transmitting terminal, a receiving terminal, and a source of information sequences, a method of correcting errors in transmitted data comprising the steps of encoding information sequences into an $(n,k)$ error-correcting block code.

generating a flag prefix for each code block indicating whether or not the block contains previously transmitted information, transmitting each block with its corresponding flag prefix from said transmitting terminal to said receiving terminal, replacing erroneous information previously received and stored at the receiving terminal with the parity section of the most recently received code block if the flag prefix of said most recently received block indicates that the block contains previously transmitted information, coding the information section of said most recently received block into a data word of $<k$ digits and in accordance with a second code, and transmitting said data word to said transmitting terminal.

2. A method as in claim 1 further comprising the steps of decoding the most recently received code block at the receiving terminal to determine if the number of errors in the block is within the error-correcting capability of said $(n,k)$ block code, and correcting errors in the information section of said most recently received code block if it is determined that the number of errors in the block is within the error-correcting capability of the $(n,k)$ block code and if the flag prefix of the block indicates that the block does not contain previously transmitted information.

3. A method as in claim 2 further comprising the step of inverting said data word prior to its transmission thereof if it is determined that the number of errors in said most recently received code block is not within the error-correcting capability of said $(n,k)$ block code and if the flag prefix of said most recently received code block indicates that the block does not contain previously transmitted information.

4. A method as in claim 3 further comprising the steps of
coding, at the transmitting terminal, said information sequences into data words of $<k$ digits in accordance with said second code,
comparing the data word received from the receiving terminal with the corresponding data word which shall have been generated at the transmitting terminal from the same information sequence from which said received data word was generated, and
if the data words compared differ by a predetermined amount,
replacing the parity sections of the most recently encoded block and certain subsequently encoded blocks with different portions of the information sequence from which said data words were generated,
generating a first flag prefix for the most recently encoded block indicating that said block contains previously transmitted information, and
transmitting said first flag prefix and said most recently encoded block to said receiving terminal.

5. A method as in claim 4 further comprising the steps of
generating a second flag prefix for the most recently encoded block if the data words compared do not differ by said predetermined amount, said second flag prefix indicating that said block does not contain previously transmitted information, and
transmitting said second flag prefix and said most recently encoded block to said receiving terminal.

6. A method as in claim 5 further comprising the steps of
encoding the data word generated at said receiving terminal into a code word of a third code prior to transmission thereof to said transmitting terminal, and
decoding said encoded data word at said transmitting terminal to correct errors therein.

7. A method of correcting errors in a data transmission system comprising the steps of
encoding information sequences at a transmitting terminal into an $(n,k)$ error-correcting block code, each block of the code including a flag signal indicating whether or not the block's parity bits have been replaced by previously transmitted information,
transmitting a block to a receiving terminal,
processing the flag signal of said transmitted block at said receiving terminal and
1. if the flag signal indicates that the block's parity bits have been replaced by previously transmitted information, applying such previously transmitted information to a utilization circuit, generating a parity word for the remaining information bits of the block in accordance with a second code, and transmitting said parity word to the transmitting terminal, and
2. if the flag signal indicates that the block's parity bits have not been replaced, (a) correcting the errors in the block if such errors are correctable, generating a parity word in accordance with said second code for the corrected information bits, and transmitting such parity word to the receiving terminal, or (b) detecting the errors in the block if such errors are detectable and not correctable and transmitting to the transmitting terminal, a word requesting retransmission of the block, comparing, at the transmitting terminal, the word received from the receiving terminal with a parity word previously generated by the transmitting terminal for said transmitted block and in accordance with said second code, and
replacing the parity bits of subsequently transmitted blocks with the information bits of the block in question if the words compared do not match.

8. A method as in claim 7 wherein the step of transmitting a word requesting retransmission comprises the steps of
generating a parity word for the information bits of the block,
inverting the bits of said parity word, and transmitting the inverted parity word to the receiving terminal.

9. A method as in claim 8 further comprising the steps of
encoding the parity word or inverted parity word, as the case may be, at the receiving terminal into a code word of a third code prior to transmission thereof to the receiving terminal, and
decoding said encoded parity or inverted parity word at the transmitting terminal to correct errors therein.

10. In a data transmission system having a transmitting terminal, a receiving terminal, and a source of information sequences, said transmitting terminal comprising
means for encoding said sequences into an $(n,k)$ block code, where $k/n < (b-1)/b$ and $b$ is an integer,
means for storing $(b-1)l$ of the most recently encoded blocks, where $l$ is an integer designating the constraint length of the system,
means for encoding said sequences into first data words of $<k$ digits in accordance with a second code,
means for comparing each of said first data words with a corresponding second data word received from the receiving terminal, said second data word having been generated at the receiving terminal in accordance with said second code from the same information sequence from which the corresponding first data word was generated, said same information sequence having been transmitted to the receiving terminal,
means responsive to signals from said comparing means for replacing the parity sections of the block most recently encoded into said $(n,k)$ block code and various like subsequently encoded blocks with different portions of the information sequence transmitted $l$ blocks previously in response to a first outcome from comparing the first and second data words generated from such sequence,
flag insertion means responsive to said first outcome for generating a flag prefix for said most recently encoded block indicating that the block contains previously transmitted information, and
means responsive to signals from said flag insertion means for transmitting each block with its corresponding flag prefix to said receiving terminal.

11. A system as in claim 10 wherein said flag insertion means further comprises means responsive to a second outcome from said means for comparing for generating a different flag prefix for the most recently encoded block indicating that the block does not contain previously transmitted information.

12. A system as in claim 11 wherein said comparing means comprises
means for generating a resultant word indicating the difference between each pair of compared first and second data words,
a threshold detector means for generating a first signal when said difference exceeds a certain predetermined threshold value for generating a second signal when said difference does not exceed said predetermined threshold value, and
a first error tracer unit for storing the $(b-1)l$ signals most recently generated by said threshold detector means and having $b-1$ output taps, the input signals to said first error tracer unit appearing at the $m^{th}$ output tap thereof at a time equal to the time necessary to transmit $ml$ blocks minus the round trip transmission delay time of the system, where $m = 1, \ldots, b-1$.

13. A system as in claim 12 wherein said replacing means comprises retransmission storage means for storing the most recent information sequence from said information source and $n-k$ other digits, logic means responsive to a said first signal on the $m^{th}$ output tap of said first error tracer unit for transferring the $m^{th}$ portion of $k/(b-1)$ digits of the $ml^{th}$ block stored in said block storing means to said retransmission storage means, where $ml^{th}$ block indicates $ml^{th}$ most recently stored block in said block storing means, and means for applying said most recent information sequence and said $m^{th}$ portion of the $ml^{th}$ block to said transmitting means.

14. A system as in claim 10, said receiving terminal comprising means for receiving blocks transmitted by said transmitting terminal, means for storing the information sections of the $(b-1)l$ blocks most recently received, a flag prefix decoder for generating a "1" output signal in response to the flag prefix of the most recently received block indicating that the block contains previously transmitted information and for generating a "0" output signal in response to such flag prefix indicating that the block does not contain previously transmitted information, and means responsive to the "1" output signal of said prefix decoder for replacing a portion of the information section of the block received $l$ blocks previously with the parity section of said most recently received block and various subsequently received blocks.

15. A system as in claim 14 further comprising means for coding the information section of the most recently received block into a second data word of $<k$ digits and in accordance with said second code, and means for transmitting said second data word to said transmitting terminal.

16. A system as in claim 15 further comprising means for decoding the most recently received block to determine if the number of errors in the block is within the error-correcting capability of said $(n,k)$ block code, and means responsive to a "0" output signal from said flag prefix decoder and to said block decoding means determining that the number of errors in the most recently received block is within the error-correcting capability of said $(n,k)$ block code for correcting errors in the information section of said most recently received block.

17. A system as in claim 16 further comprising means responsive to a "0" output signal from said flag prefix decoder and to said block decoding means determining that the number of errors in the most recently received block is not within the error-correcting capability of said $(n,k)$ block code for inverting said second data word prior to transmission thereof to said transmitting terminal.

18. A system as in claim 17 further comprising means at said receiving terminal for encoding said second data word into a code word of a third code prior to transmission thereof to said transmitting terminal, and means at said transmitting terminal for correcting errors in said encoded second data word.

19. A system as in claim 18 wherein said receiving terminal replacing means comprises a second error tracer unit for storing the $(b-2)l$ output signals most recently generated by said flag prefix decoder and having $b-1$ output taps, the $j^{th}$ such tap being from the $jl^{th}$ signal position from the input of said second error tracer unit, said input constituting the $0^{th}$ such tap, where $j=0,\ldots,b-2$, and a logic circuit responsive to a "1" signal on the $j^{th}$ tap of said second error tracer unit for applying the parity section of the most recently received block to the $j^{th}$ group of $k/(b-1)$ digit position of the $jl^{th}$ section of $k$ digit positions in said $(b-1)l$ block storing means, where the $jl^{th}$ section contains the $jl^{th}$ most recently stored information section.

20. A system as in claim 19 further comprising an $l$-bit storage unit, means responsive to "0" signals being stored in every $l^{th}$ position of said second error tracer unit and to said block decoding means determining that the number of errors in the most recently received block is not within the error-correcting capability of said $(n,k)$ block code for applying a "1" signal to said $l$-bit storage unit and responsive to a "1" signal stored in one of the $jl^{th}$ positions of said second error tracer unit or to said block decoding means determining that the number of errors in the most recently received block is within the error-correcting capability of said $(n,k)$ block code for applying a "0" signal to said $l$-bit storage unit, and means responsive either to a "1" output signal from said flag prefix decoder or to a "1" signal stored in the $l^{th}$ position of said $l$-bit storage unit for applying a "1" to said second error tracer unit, where said $l^{th}$ position contains the earliest received signal of the $l$ signals currently stored in said $l$-bit storage unit.

* * * * *